(12) United States Patent
Roberts et al.

(10) Patent No.: US 12,554,474 B1
(45) Date of Patent: Feb. 17, 2026

(54) PROBABILISTIC CODE ROLLOUT WITH REPRODUCIBLE RESULTS

(71) Applicant: Egnyte, Inc., Mountain View, CA (US)

(72) Inventors: Sean Elliott Roberts, Mountain View, CA (US); Ran Simha Biron, Santa Clara, CA (US); Shishir Sharma, Mountain View, CA (US)

(73) Assignee: Egnyte, Inc., Mountain View, CA (US)

( * ) Notice: Subject to any disclaimer, the term of this patent is extended or adjusted under 35 U.S.C. 154(b) by 213 days.

(21) Appl. No.: 18/420,733

(22) Filed: Jan. 23, 2024

Related U.S. Application Data

(60) Provisional application No. 63/440,599, filed on Jan. 23, 2023.

(51) Int. Cl.
*G06F 9/44* (2018.01)
*G06F 8/60* (2018.01)
*G06F 8/61* (2018.01)
*G06F 9/455* (2018.01)
*H04L 29/06* (2006.01)

(52) U.S. Cl.
CPC ...................... *G06F 8/60* (2013.01)

(58) Field of Classification Search
CPC ... G06F 8/60; G06F 9/451; G06F 8/38; G06F 8/35; G06F 8/71; G06F 11/368; G06F 8/65; G06F 9/44505; G06F 11/3006; G06F 11/3452; G06F 8/64; G06F 9/544; G06F 9/5044; G06F 9/5055; G06F 9/449; G06N 20/00

See application file for complete search history.

(56) References Cited

U.S. PATENT DOCUMENTS

| | | | | |
|---|---|---|---|---|
| 11,366,832 B2* | 6/2022 | Woodmansee | .......... | H04L 41/50 |
| 11,651,251 B2* | 5/2023 | Chu | ....................... | G06N 20/00 706/12 |

* cited by examiner

*Primary Examiner* — Thuy Dao
(74) *Attorney, Agent, or Firm* — Larry E. Henneman, Jr.; Henneman & Associates, PLC (57) ABSTRACT

Systems and methods for progressively releasing features used in conjunction with a service in a computing environment are disclosed. The computing environment includes users and resources. A method includes providing access to the service to the plurality of users and providing a particular feature to be used in conjunction with the service. The method can additionally include maintaining a directory of the entities of the computing environment. The entities can include the users and/or the resources. The directory of the entities organizes the entities into groups. The example methods can also include assigning an access value associated with the particular feature to a particular group of the groups. The access value can indicates an assigned probability that the feature will be enabled with respect to a particular entity included in the particular group. The assigned probability can advantageously be greater than zero and less than one.

20 Claims, 8 Drawing Sheets

PROBABILISTIC CODE ROLLOUT WITH REPRODUCIBLE RESULTS

RELATED APPLICATIONS

This application claims the benefit of U.S. Provisional Patent Application No. 63/440,599, filed on Jan. 23, 2023, by the same inventors, which is incorporated herein by reference in its entirety.

BACKGROUND OF THE INVENTION

Field of the Invention

This invention relates generally to software distribution and, more particularly, to systems and methods for making revised software and/or new features available to users.

Background

Releasing code changes to a service that is being actively used is inherently risky. Introducing imperfect code changes in a business setting, for example, can cause loss of business, wasted man-hours, security breaches, etc. However, in order to improve services, it is desirable for providers to make changes to their code. Prior systems and methods for introducing code changes do not sufficiently limit risks.

SUMMARY

Systems and methods for limiting risk while implementing changes to a service are disclosed. In order to decrease exposure to undiscovered bugs or performance issues, it is desirable to roll out a code change to a progressively wider audience. In the initial phases of the rollout it may be desirable to specify particular users, domains, etc. to use the new code. Later, it becomes more useful to define sets of the user base or portions of a set without having to specifically enumerate the particular constituents of the set (e.g. 25% of a data center).

Code changes can be written behind (e.g., associated with) feature flags. These feature flags can be pulled from a hierarchical settings service. In the hierarchical settings service the values that are set and retrieved are typically with respect to a certain context (e.g., associated with a particular group of users, a subgroup of users, or an individual). For example, a value can be set for an entire domain, and a different value can be set for a specific user in that domain. If the settings service is queried while in that user's context, the value returned can be the one set for that particular user. If fetched/queried for any other user in that domain, then the value returned can be the one set for the entire domain. This enables a rollout (e.g., granting access to new or revised features) to specific entities first, then a wider rollout to more expansive entities (e.g., larger groups) higher up in the hierarchy next.

Rather than store a Boolean in the hierarchical settings service, a value, for example an integer or other number, which represents the probability that a feature is enabled, can be stored instead. This allows for an update to be rolled out to a subset within a given context. The code that checks to determine whether a particular feature is enabled can first derive a hash, the contents of which will be described hereinafter. An operation, for example a modulo operation, can then be performed on the hash using the maximum allowed probability as the divisor. The result will be a number between 0 and the maximum probability. The result of the modulo function can then be compared with the value stored in the hierarchical settings service and, if the result is less than the stored value, the feature can be determined to be enabled.

The hash used for the above computation is typically derived from a list of strings but, in a particular example, can have two parts: a seed and partition parameters. The partition parameters can be values relevant to the business logic that are used to decide whether the feature flag is enabled for particular subsets of users. For example, if it were desirable to roll out a feature for 25% of domains in a data center, then the domain name could be passed in as a partition parameter. Multiple unrelated feature flags can use the same partition parameters (e.g., multiple new features can be rolled out to the same group(s) of users), so a seed can be used to de-correlate the roll out order if desired.

By setting the probability stored in the hierarchical settings service to 0 or the maximum probability, the behavior reduces to what it would be if simple Boolean feature flags were stored. However, storing a number generally, or an integer in a specific example, affords the possibility of rolling out only to a subset of calls within that context. Importantly, this subset can be partitioned with parameters that are related to the business logic, but not necessarily part of the context.

Deriving a stable hash, instead of using a random number, has benefits in the context of feature rollouts, especially related to limiting exposure. For example, if a user checks whether a feature is enabled, and there is a random 1% chance that the feature is enabled, then, as the user continues to check, the probability that they encounter the feature being enabled at least once approaches 100%. On the other hand, if a hash is compared against the stored value in the scheme described above, then ~1% of users will see that the feature is enabled, and no user will observe a different outcome to the feature enablement query on subsequent queries. This is because the stable hash derived for a particular user will be the same each time the settings service attempts to determine availability of a feature, and thus the result of the determination (feature available or not available) will also be the same.

The repeatability in the hashing of the partition parameters has another consequence. Any rollouts which use the same partition parameters will have the same rollout order. The additional seed included in the hash allows the user the option of retaining this property (same rollout order) by using the same seed in both rollouts, or de-correlate them (different rollout order) by using a different seed.

An example method for progressively releasing features used in conjunction with a service in a computing environment is disclosed. The computing environment can include a plurality of users and a plurality of resources. The method includes providing access to the service to the plurality of users and providing a particular feature to be used in conjunction with the service. The method can additionally include maintaining a directory of at least some entities of the computing environment. The entities can include the users of the plurality of users and/or the resources of the plurality of resources. The directory of the entities can organize the entities into groups.

The example method can also include assigning an access value associated with the particular feature to a particular group of the groups. The access value can indicate an assigned probability that the feature will be enabled with respect to a particular entity included in the particular group. The assigned probability can advantageously be greater than zero and less than one.

Responsive to the particular entity interacting with the service, the directory can be accessed to determine the access value assigned to the particular group. Then, based on the access value associated with the particular feature, it can be determined whether the particular feature is to be enabled with respect to the particular entity. Based on the determination, the particular feature can be enabled with respect to the particular entity.

In a particular example method, the access value can be a number, and the step of determining whether the particular feature is to be enabled with respect to the particular entity can include performing a calculation utilizing the number as an input. A result of the calculation can be a Boolean value.

The particular example method can additionally include enabling the particular feature with respect to the particular entity if the Boolean value is equal to a first predetermined value. The particular feature can be disabled with respect to the particular entity if the Boolean value is equal to a second predetermined value different from the first predetermined value.

In a particular example method, the step of performing the calculation utilizing the number, which can optionally be an integer, can include calculating a hash value utilizing information associated with the particular group and a hash function. This step can additionally include performing a modulo operation on the hash value using a predetermined maximum probability value as the modulus to produce a remainder value. The maximum probability value can be a predetermined maximum possible value of the access value. Whether the remainder value is greater than, less than, or equal to the access value can then be determined.

In a more particular example method, the step of performing the calculation utilizing the integer as the input further can include assigning the first predetermined value to the Boolean value if the remainder value is less than the access value, and assigning the second predetermined value to the Boolean value if the remainder value is greater than or equal to the access value. The information associated with the particular group can include a string uniquely indicative of the particular group.

In a particular example method, the step of calculating the hash value can include calculating the hash value utilizing at least a first seed string in combination with the information associated with the particular group. The first seed string can be associated with the particular feature and can be independent of the particular group and the particular user. The step of performing the calculation utilizing the number as the input can produce a different Boolean value when utilizing a second seed string different from the first seed string.

Example methods can additionally include determining whether to enable the particular feature with respect to a second entity included in a second group using information associated with the second group, enabling the particular feature with respect to the particular entity, and disabling the particular feature with respect to the second entity. The access value corresponding to the particular entity can be the same as a second access value corresponding to the second entity, and the information associated with the particular group can be different than the information associated with the second group.

Another example method can additionally include determining whether to enable the particular feature with respect to a second entity, and the second entity can be included in the particular group. The method can additionally include assigning a second access value associated with the particular feature to the second entity. The second access value can be indicative of a second assigned probability that the particular feature will be enabled with respect to the second entity. The second access value can be an entity-level access value assigned to the second entity in the directory of the entities. The entity-level access value can be a second number. The step of determining whether to enable the particular feature with respect to the second entity can include performing a second calculation utilizing the second number as an input. The result of the second calculation can be a second Boolean value. The step of determining whether to enable the particular feature with respect to the second entity can include enabling the particular feature with respect to the second entity if the second Boolean value is equal to a first predetermined value and disabling access to the particular feature with respect to the second entity if the second Boolean value is equal to a second predetermined value different from the first predetermined value. The step of determining whether to enable the particular feature with respect to the second entity can include calculating a second hash value utilizing the hash function and information associated with the second entity. The information associated with the second entity can be different from the information associated with the particular group.

In an example method, the particular entity can be a particular user, and the particular group can be a group including the particular user and other users. Optionally, the particular entity can be a particular file system object, and the particular group can be a folder, drive, etc. including the particular file system object and other file system objects.

Example systems for progressively releasing features used in conjunction with a service in a computing environment including a plurality of users and a plurality of resources are also disclosed. An example system includes at least one hardware processor and memory. The hardware processor(s) can be configured to execute code, and the code can include a set of native instructions for causing the hardware processor to perform a corresponding set of operations when executed by the hardware processor. The memory can store storing data and the code. The data and the code can include a particular feature of the software service and a directory of at least some entities of the computing environment. The entities can include the users of the plurality of users and the resources of the plurality of resources. The directory of the entities can also organize the entities into groups, for example of a hierarchal structure.

The code can additionally include first, second, third, fourth, and fifth subsets of the set of native instructions. The first subset of the set of native instructions can be configured to provide access to the service to the plurality of users. The second subset of the set of native instructions can be configured to receive an access value associated with the particular feature and to associate the access value with a particular group of the groups. The access value can be indicative of an assigned probability that the feature will be enabled with respect to a particular entity included in the particular group. The assigned probability can be greater than zero and less than one. The third subset of the set of native instructions can be configured to access the directory to determine the access value assigned to the particular group, responsive to the particular entity interacting with the service. The fourth subset of the set of native instructions can be configured to determine, based on the access value associated with the particular feature, whether the particular feature is to be enabled with respect to the particular entity. The fifth subset of the set of native instructions can be configured to enable the particular feature with respect to the particular entity if it is determined that the particular feature should be enabled with respect to the particular entity.

In a particular example system, the access value can be a number. The fourth subset of the set of native instructions can be configured to perform a calculation utilizing the number as an input, and a result of the calculation can be a Boolean value. The fifth subset of the set of native instructions can be configured to enable the particular feature with respect to the particular entity if the Boolean value is equal to a first predetermined value. The data and the code can include a sixth subset of the set of native instructions configured to disable the particular feature with respect to the particular entity if the Boolean value is equal to a second predetermined value different from the first predetermined value.

In a particular example system, the fourth subset of the set of native instructions can be configured to calculate a hash value utilizing information associated with the particular group and a hash function. A modulo operation can be performed on the hash value using a predetermined maximum probability value as the modulus to produce a remainder value. The maximum probability value can be a predetermined maximum possible value of the access value. The fourth subset of the set of native instructions can also be configured to determine whether the remainder value is greater than, less than, or equal to the access value.

In a more particular example system, the fourth subset of the set of native instructions can be configured to assign the first predetermined value to the Boolean value if the remainder value is less than the access value, and assign the second predetermined value to the Boolean value if the remainder value is greater than or equal to the access value. The information associated with the particular group can include a string uniquely indicative of the particular group.

In example system, the fourth subset of the set of native instructions can be configured to calculate the hash value utilizing at least a first seed string in combination with the information associated with the particular group. The first seed string can be associated with the particular feature and can be independent of the particular group and the particular user. The fourth subset of the set of native instructions can also be configured to produce a different Boolean value when utilizing a second seed string different from the first seed string.

In a particular example system, the fourth subset of the set of native instructions can be configured to determine whether to enable the particular feature with respect to a second entity, included in a second group, using information associated with the second group. The fifth subset of the set of native instructions can be configured to enable the particular feature with respect to the particular entity, and the sixth subset of the set of native instructions can be configured to disable the particular feature with respect to the second entity. The access value corresponding to the particular entity can be the same as a second access value corresponding to the second entity, and the information associated with the particular group can be different than the information associated with the second group.

In an example system, the fourth subset of the set of native instructions can be configured to determine whether to enable the particular feature with respect to a second entity. The second subset of the set of native instructions can be configured to receive a second access value associated with the particular feature and to associate said second access value with the second entity. The second access value can be indicative of a second assigned probability that the particular feature will be enabled with respect to the second entity. The second access value can be an entity-level access value assigned to the second entity in the directory of the entities. The entity-level access value can be a second number. The fourth subset of the set of native instructions can be configured to perform a second calculation utilizing the second number as an input. A result of the second calculation can be a second Boolean value. The fifth subset of the set of native instructions can be configured to enable the particular feature with respect to the second entity if the second Boolean value is equal to a first predetermined value. The sixth subset of the set of native instructions can be configured to disable access to the particular feature with respect to the second entity if the second Boolean value is equal to a second predetermined value different from the first predetermined value. The fourth subset of the set of native instructions can be configured to calculate a second hash value utilizing the hash function and information associated with the second entity. The information associated with the second entity can be different from the information associated with the particular group. Optionally, the fifth subset of native instructions and the sixth subset of native instructions can be a combined subset of instructions that provides both of the enable/disable functions.

In an example system, the particular entity can be a particular user, and the particular group can be a group including the particular user and other users. Optionally, the particular entity can be a particular file system object, and the particular group can be a file folder, a storage device, etc. including the particular file system object and other file system objects.

BRIEF DESCRIPTION OF THE DRAWINGS

The present invention is described with reference to the following drawings, wherein like reference numbers denote substantially similar elements.

DETAILED DESCRIPTION

The present invention overcomes the problems associated with the prior art, by providing a system for rolling out software upgrades in a probabilistic, yet consistent and reproducible manner. In other words, access to a new software feature is determined through a quasi-probabilistic scheme, in which the initial determination of feature access is repeated until some change is made to the settings, for example. In the following description, numerous specific details are set forth (e.g., particular data schemes, particular settings, particular algorithms, particular network architectures, etc.) in order to provide a thorough understanding of the invention. Those skilled in the art will recognize, however, that the invention may be practiced apart from these specific details. In other instances, details of well-known software distribution practices and components have been omitted, so as not to unnecessarily obscure the present invention.

Figure 1:
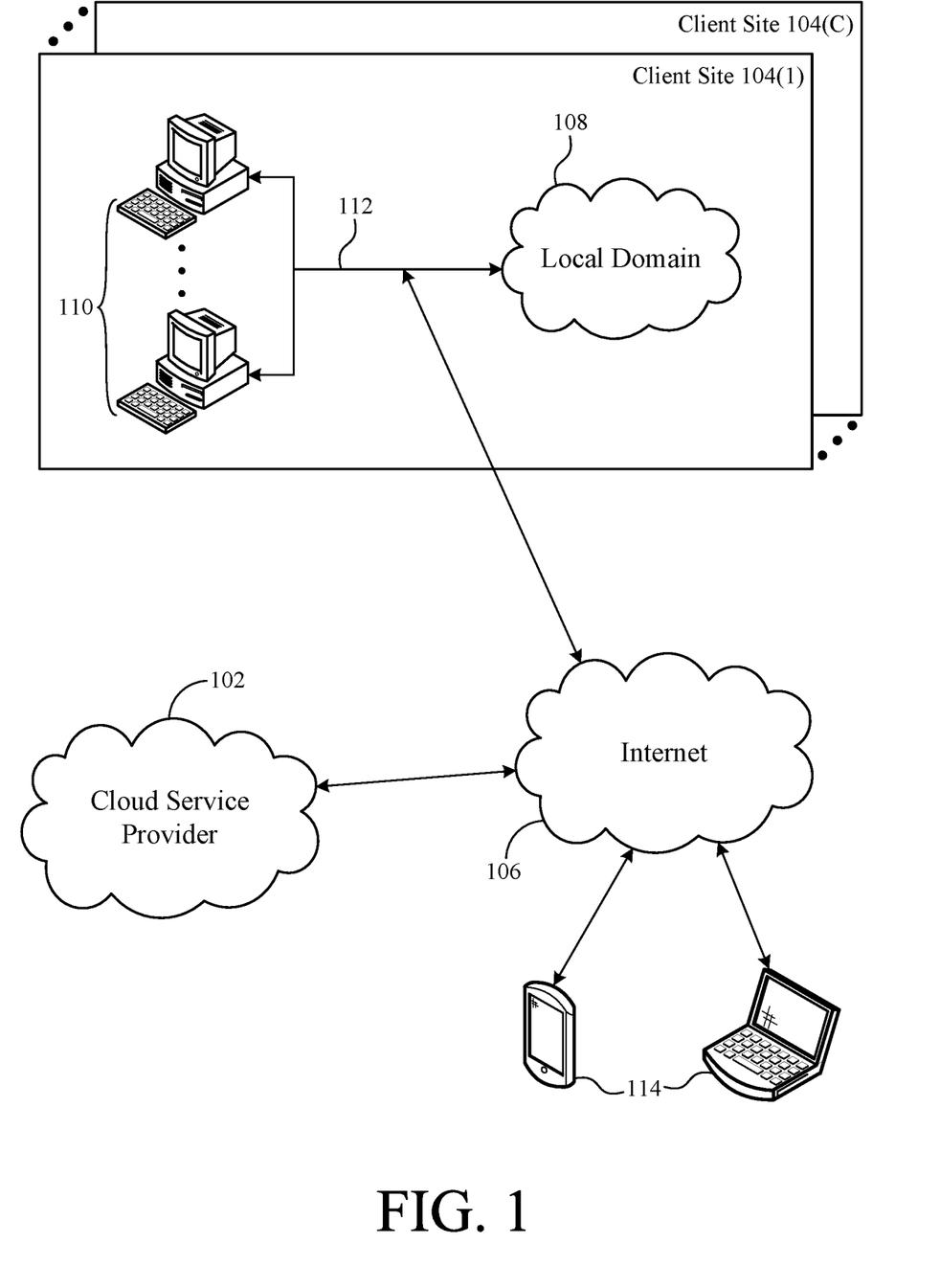
FIG. 1 is a block diagram showing a plurality of client sites communicating with a cloud service provider.

FIG. 1 shows a cloud computing system 100, including a cloud service provider 102 and a plurality of client sites 104(1-C), which are interconnected and communicate via an internetwork, which in this example can be the Internet 106. Cloud service provider 102 (e.g. a company or other entity) provides cloud computing services, such as data storage, remote data access, software as a service, platform as a service, infrastructure as a service, and so on, to various clients associated with client sites 104. Cloud service provider 102 can be widely distributed, including between separate continents, in order to provide efficient services to clients in various geographic locations.

Client sites 104 are associated with various clients of the aforementioned cloud service provider. In the example embodiment, each of client sites 104 is associated with a separate client, where the clients are unaffiliated with one another. In alternate embodiments, some of the clients may be associated with multiple of client sites 104, or all of client sites 104 may be associated with a single entity. In yet another alternative embodiment, all of data centers 102 and client sites 104 may be owned and operated by a single entity in an enterprise configuration. In such a configuration, Internet 106 can be replaced by another network, such as a private wide area network. In yet another alternative, the components of data centers 102 and client sites 104 may be co-located, wherein Internet 106 is replaced by a local area network. These and other alternatives will be apparent to those skilled in the art in view of the present disclosure.

Client sites 104 include a local domain 108 and local clients 110 interconnected via a local network 112. Local domain 108 includes, by way of non-limiting example, at least one network-attached storage (NAS) device, which is configured to store local client data (e.g., files, folders, software, configuration data, etc.). In the example embodiment, local domain 108 includes a local file system comprising files and folders organized in a hierarchical directory. Local clients 110 may access local domain 108 via local network 112, in order to access and/or alter files and folders of the local file system. In the example embodiment, at least a portion of the local file system is bi-directionally synchronized with a remote file system stored on cloud service provider 102. Changes made to the portion of the local file system are propagated to the remote file system and applied there to maintain synchronization between the file systems. Similarly, any changes made to a synchronized portion of the remote file system are propagated to the local file system and applied there.

Bi-directional synchronization of the file systems maintained by local domain 108 and cloud service provider 102 allows for remote access to the synchronized portion of the file systems. Remote clients 114 can access the remote file system stored by cloud service provider 102 via Internet 106. Remote clients 114 include computing devices located geographically remotely from cloud service provider 102, but that have the capability of accessing data over the Internet 106. Remote clients 120 include, but are not limited to, smartphones, laptop computers, desktop computers, and so on.

Any or all of the features and/or services provided to local clients 110 or remote clients 114 are facilitated by code operating on computer hardware, software, firmware, or any combination thereof. In the example embodiment, developers associated with cloud service provider 102 can utilize Internet 106 to push software updates to local domain 108, local clients 110, and/or remote clients 114. In the example, developers may choose to provide access to new software features only to a subset of client sites 104, a subset of local clients 110, and/or a subset of remote clients 114 in a probabilistic manner. The developers can also provide updates to particular users and/or particular client sites through the same framework. Additional details regarding the provision of software updates to various entities will be provided in the following disclosure.

Figure 2:
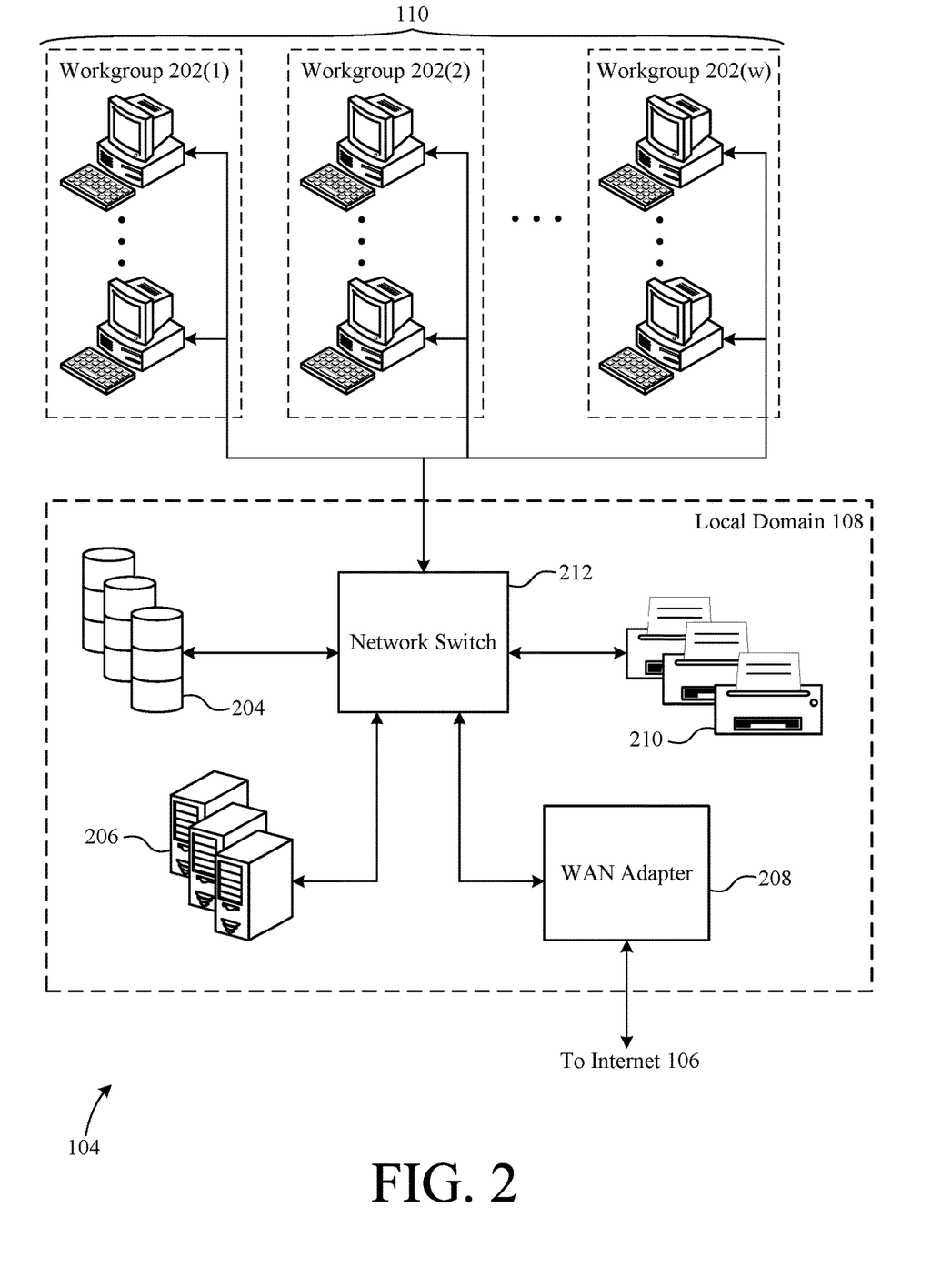
FIG. 2 is a block diagram showing one of the client sites of FIG. 1 in greater detail.

FIG. 2 is a block diagram showing an example client site 104 in greater detail. Client site 104 includes local clients 110 (organized into a plurality of workgroups 202(1-$w$)), storage devices 204, servers 206, a WAN adapter 208, and peripherals 210, all interconnected and communicating via a network switch 212. Together, storage devices 204, servers 206, WAN adapter 208, and peripherals 210 constitute local domain 108. Storage devices 204, at least in this example embodiment, are network-connected storage (NAS) devices including hard disk drives (HDDs) and/or solid state drives (SSDs) for storing digital data including a local file system, a directory, software, etc. Servers 206 provide processing power for various functions of local domain 108 including, but not limited to, allowing remote access to local domain 108, hosting web pages, executing software and other code, and so on. WAN adapter 208 provides elements of local domain 108 with access to wide-area networks (e.g. Internet 106). Peripherals 210 include any peripheral devices connected to local domain 108, such as printers, copiers, fax machines, and so on. In the example embodiment, network switch 212 is an Ethernet switch that connects each of the elements of local domain 108 to the other elements via packet switching. Network switch 212 allows users 110 to communicate with and access resources of local domain 108.

Users 110 are organized into workgroups 202 for various reasons. Each of workgroups 202 may be assigned different file system and/or hardware permissions. For example, workgroup 202(1) may consist of management and have assigned permissions that correspond to that role. Organizing users into workgroups 202 also allows for targeted and/or probabilistic rollout of software upgrades. For example, developers may want to rollout a software update to just a single workgroup or to only a certain percentage of workgroups without the need to select the workgroups manually. More detail and explanation regarding the probabilistic rollout of software updates will be provided with reference to FIGS. 3A-3D below.

FIGS. 3A-3D show four separate example contexts for providing a software feature to a particular user.

Example One

Figure 3A:
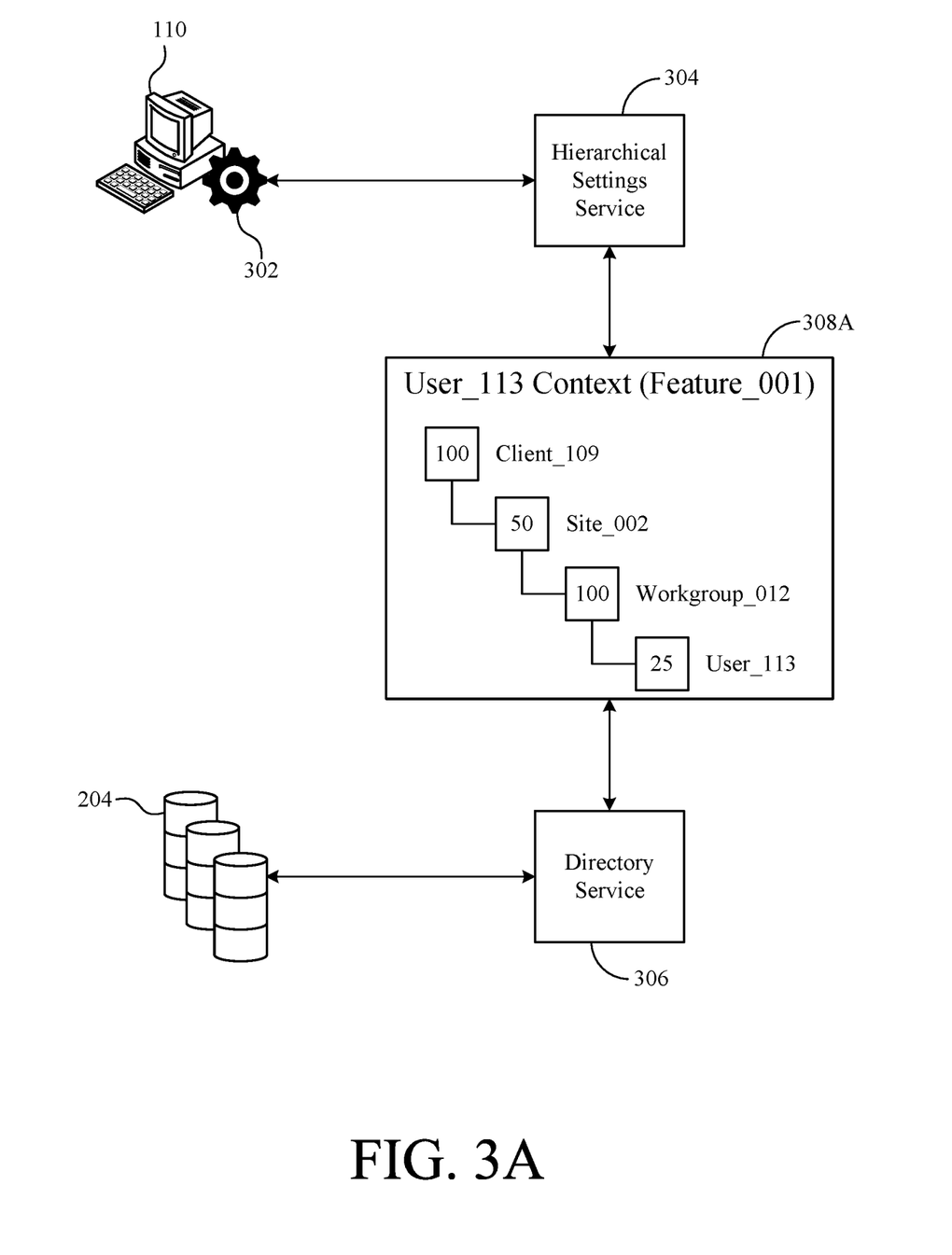
FIG. 3A is a block diagram showing an example of hierarchical settings being used for determining feature access.

FIG. 3A is a block diagram showing one of users 110 running software 302. Software 302 includes at least one feature flag that accesses a hierarchical settings service 304 to determine whether user 110 has access to a corresponding feature (e.g. "Feature_001") of software 302. Hierarchical settings service 304 utilizes a directory service 306 in order to generate a user context 308A corresponding to the particular flagged feature of software 302. User context 308A contains various settings that together determine the likelihood that the flagged feature will be available to the corresponding user.

In the example embodiment, "user_113" is associated with a feature value of "25". In this example, the feature value "25" represents a 25% chance that user_113 will be granted access to the feature. Because, in this example, a value is provided at the user-level, that value determines the likelihood that this particular user will be granted access to the flagged feature. However, another user in the same workgroup may not have a value assigned at the user-level, in which case the next-lowest level with an assigned value should be utilized. In the current example, the value for another user in "workgroup_012" is 100, because that is the value assigned to the entire workgroup. This means each user in this workgroup has certain access to the feature (i.e., 100%), unless otherwise specified (by a different value at the user-level).

The following pseudocode provides additional detail regarding a non-limiting, example software implementation of the present example embodiment:

```
1: get_feature(new)
2: initialize_string(user)
3: set user=query(directory, current_username)
4: initialize_string(workgroup)
5: set workgroup=query(directory, current_workgroup)
6: initialize_string(site)
7: set site=query(directory, current_site)
8: initialize_string(client)
9: set client=query(directory, current_client)
10: initialize_variable(setting)
11: initialize_string(pparam)
12: query(HSS, user)
13: if query(HSS, user)=undefined, then query(HSS, workgroup)
14: if query(HSS, workgroup)=undefined, then query (HSS, site)
15: if query(HSS, site)=undefined, then query(HSS, client)
16: if query(HSS, client)=undefined, set integer=0
17: else set setting=query(HSS, client) and set pparam
18: =client
19: else set setting=query(HSS, site) and set pparam=site
20: else set setting=query(HSS, workgroup) and set pparam=
21: workgroup
22: else set setting=query(HSS, user) and set pparam=user
23: initialize_variable(fflag)
24: initialize_variable(prob_max)
25: set prob_max=100
26: initialize variable(hash)
27: get hash_function(SHA-2)
28: initialize string(seed_1)
29: set seed_1=feature_name
30: set hash=SHA-2(seed_1+pparam)
31: set fflag=modulo(hash, prob_max)
32: if fflag<setting, then run(feature(new))
33: else print(Feature Access Denied)
```

The first line of the pseudocode simply loads the code corresponding to the new feature into memory. The following portion of the pseudocode (lines 2-11) initializes several strings/variables and sets the values of the strings. The string "user" is set to the username of the current user, the string "workgroup" is set to the name of the workgroup including the user, the string "site" is set to the name of the site that the user is assigned, and the string "client" is set to the name of the client associated with the user. The names used for each of these strings are queried from directory service 306 or user context 308. Finally, the variable "setting" and the string "pparam" are initialized. These entries are utilized to perform the hash calculation to determine whether or not the user is granted access to the new feature. In alternate embodiments, the strings "user", "workgroup", "site", and "client" can be set and/or initialized after the algorithm determines which of the strings are needed for performing the probabilistic calculation to determine feature access.

The portion of the algorithm (lines 12-22) including the nested "if/else" statements queries the hierarchical settings service 304 for the appropriate setting, starting with the entry in the user setting. If the user setting is undefined, the algorithm queries the workgroup setting. If the workgroup setting is undefined, the algorithm queries the site setting, and so on, until a setting with a valid entry is identified. The first valid entry that is identified is used as the value for the "setting" variable. If there are no valid entries in any of the settings categories, the setting is set to 0, which guarantees that the user does not have access to the new feature. Additionally, this section of the pseudocode sets the string "pparam" to reflect the name of the category (e.g., "user_113", "workgroup_012", "site_002", etc.) that contained the first valid entry within the user's context.

In an alternate embodiment, the algorithm can query the settings from the broadest level down to the most specific level in order to identify the first valid entry. For example, in an alternate embodiment, the algorithm can utilize the client setting as the value for the "setting" variable, even if there is a value entered for the workgroup setting and/or the user setting. In yet another embodiment, the feature flag itself can specify which setting should be used, which order the settings should be queried, etc.

A final section of the pseudocode (lines 23-33) performs the probabilistic calculation to determine feature access for the user. Initially, variables "fflag" and "prob_max", and "hash" are initialized, with variable "prob_max" being set equal to 100 (in this example). Then, the value of the variable "hash" is calculated and set by determining the value of a SHA-2 hash, for example, of a seed string (e.g. set equal to the name of the new feature) and the string "pparam", which is set as described above. Finally, the variable "fflag" is set equal to the modulo of the hash value with respect to the "prob_max" variable, and the algorithm runs the new feature if the value of "fflag" is less than the value of "setting". Because the SHA-2 hash function provides a reproducible, pseudorandom output, the example pseudocode allows for probabilistic enablement of the feature written behind the example feature flag while maintaining a consistent result for each user in subsequent calculations. Comparing the modulo of a random variable with respect to the max probability with the assigned setting means that the probability that a user is granted access to the feature is equal to the quotient of the "setting" and "prob_max" variables. For example, given a setting of "50", the probability that a user would be able to access the feature is 50/100=50%.

The example embodiment offers several advantages. First, the pseudorandom nature of the hash function allows developers to roll out software features in a probabilistic way by simply assigning a probability value to a user (or a group of users). Additionally, by utilizing a seed value that is unique to the particular feature, the example algorithm prevents the situation in which the same users, workgroups, etc. are always the first to be granted access to a new feature. Finally, the hierarchical structure of the settings service allows for precise control over the rollout of the feature. For example, developers can select individual users to give 100% access probability, give all users a particular probability, give entire workgroups, sites, and/or clients a particular probability, and/or select particular workgroups, sites, and/or clients to give 100% access probability. Developers can even select particular users, workgroups, sites, and/or clients to give particular access probabilities. In other words, the current example provides developers with the ability to assign any access probability to any subset of users, workgroups, domains, etc. in as much or as little detail as desired.

In an alternate embodiment, discussed below, the code for resolving the feature flag can start at the client level and descend the hierarchy. In yet another alternate embodiment, also discussed below, the code can directly query a relevant category for the setting, rather than ascending/descending the hierarchy to identify the appropriate entry. Indeed, all three alternatives (or more) can be utilized within a single system, allowing developers to utilize whichever method is best suited for resolving the feature flag of a particular feature.

In yet another alternate example embodiment, the system can utilize a different calculation for resolving the feature flag. Indeed, any method for transforming an integer value into a Boolean value (e.g., true/false, provide/deny access, etc.) provides benefits in the context of the present invention. In additional alternate embodiments, feature flags can determine access to one of a plurality of different feature alternatives. In a particular example of such an embodiment, the result can be resolved from the modulo of the hash by comparing the remainder to a plurality of "tiers" corresponding to the feature alternatives. As an even more particular example, the tiers can consist of possible relationships between the remainder and the setting, such as within 20% of the setting value, within 40% of the setting value, etc. These and other alternatives to the example method for resolving the feature flag will be apparent to those of ordinary skill in the art, particularly in view of the present disclosure.

Example Two

Figure 3B:
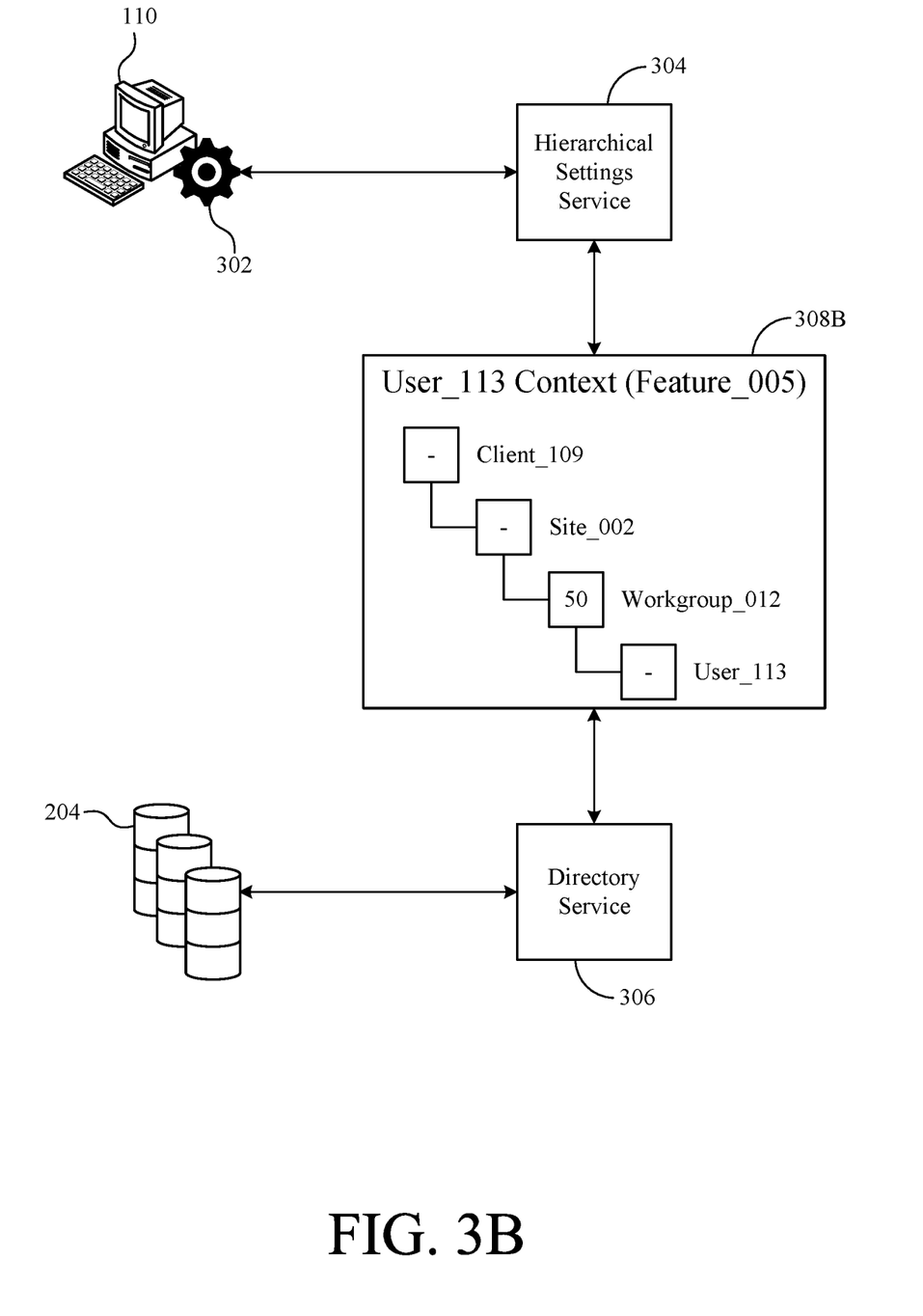
FIG. 3B is a block diagram showing another example of hierarchical settings being used for determining feature access.

FIG. 3B is a block diagram similar to FIG. 3A, but showing a different context 308B associated with a different feature ("Feature_005"). Context 308B shows the same hierarchy as 308A, because it is the context associated with the same user ("User_113"). However, context 308B includes different settings, because it is associated with the new feature. In this example, the setting for "User_113", "Site_002", and "Client_109" are undefined. Instead, there is a single setting for "Workgroup_012".

In the example embodiment, the code for resolving the feature flag corresponding to Feature_005 is also slightly different from the pseudocode corresponding to example one, above. In particular, lines 12-22 of the above pseudocode are replaced with a simple query for the workgroup setting, and the string pparam is set equal to the workgroup name. The following lines of pseudocode illustrate the differences between the two examples:

```
1: get_feature(new)
2: initialize_string(workgroup)
3: set workgroup=query(directory, current_workgroup)
4: initialize_variable(setting)
5: initialize_string(pparam)
6: set pparam=workgroup
7: query(HSS, workgroup)
8: set setting=query(HSS, workgroup)
9: initialize_variable(fflag)
10: initialize_variable(prob_max)
11: set prob_max=100
12: initialize variable(hash)
13: get hash_function(SHA-2)
14: initialize string(seed_1)
15: set seed_1=feature_name
16: set hash=SHA-2(seed_1+pparam)
17: set fflag=modulo(hash, prob_max)
18: if fflag<setting, then run(feature(new))
19: else print(Feature Access Denied)
```

In this example, Feature_005 only applies to workgroups, because the feature specifically alters how users collaborate within a workgroup, for example. Therefore, access is not determined at the user-level, because every user in a given group should either have access to the feature or not. Similarly, there may be protected groups that are too important for testing feature rollout. Therefore, access is not determined at the site or client level, because protected groups in a permitted site could then potentially utilize the feature. Consequently, implementation of Feature_005 should only access the workgroup settings and not the rest of the hierarchy. It should be noted that, in the example embodiment, because the hash function is calculated based in part on the name of the workgroup, all users in a particular workgroup will have the same access rights. In other words, there is a 50% probability that all users in Workgroup_002 will have access to the feature and a 50% probability that none of the users will have access.

Example Three

Figure 3C:
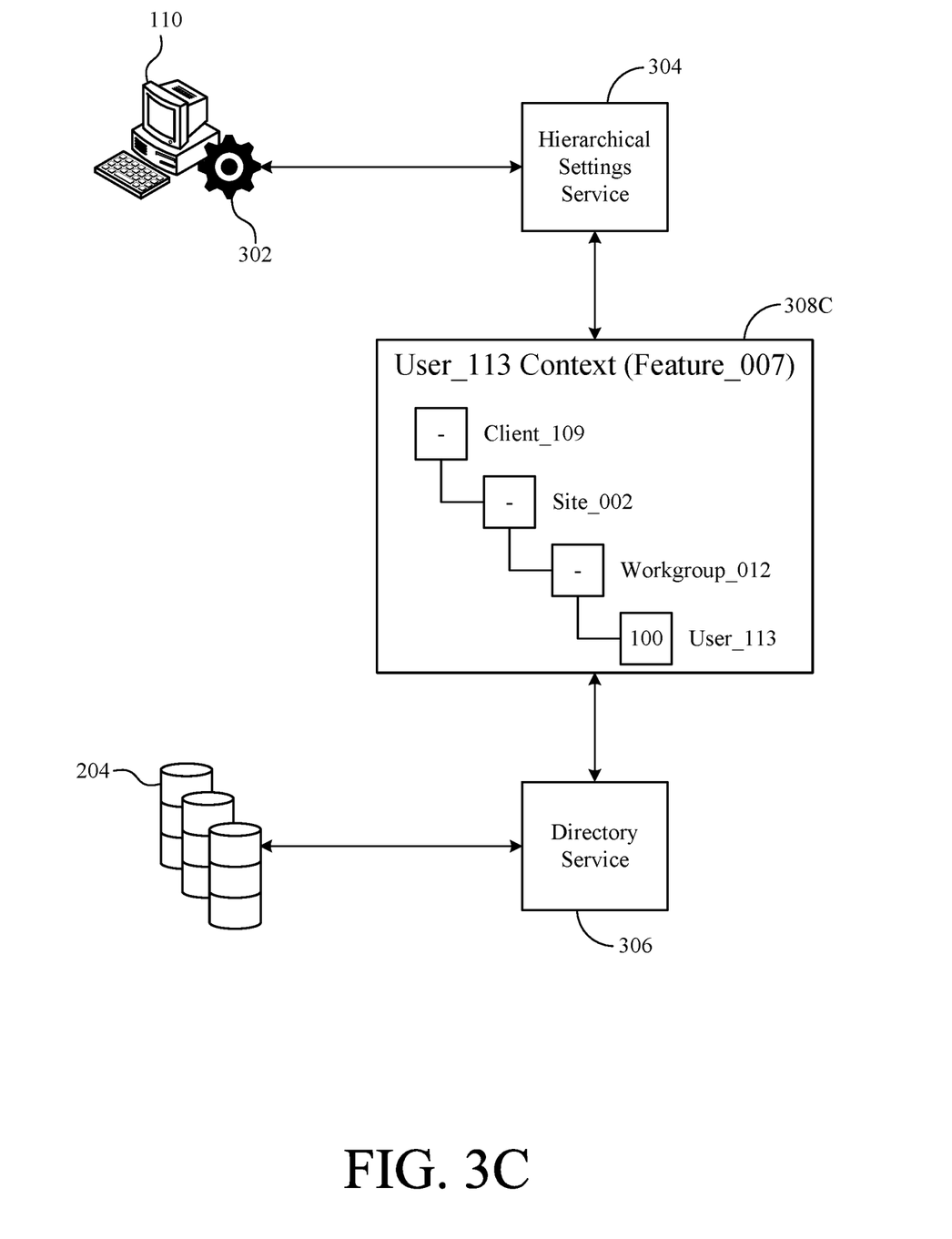
FIG. 3C is a block diagram showing yet another example of hierarchical settings being used for determining feature access.

FIG. 3C is another block diagram similar to FIG. 3A, but showing yet another different user context 308C, corresponding to yet another software feature ("Feature_007"). For this context, the only setting with a defined value is the user setting, which is set to "100". In this case, the developers have specifically selected this user to have access to the feature, while no other user (unless specifically given an access setting) will be able to access the feature. Essentially, a value of "100" is a Boolean that gives the user access to the feature, while a value of "0" is a Boolean that denies the user access. Another alternative system could utilize Boolean values and probabilistic values (as described in the foregoing disclosure) together in the same hierarchy. In such a system, true Booleans could be used to avoid unnecessary hashing/feature flag calculations.

Example Four

Figure 3D:
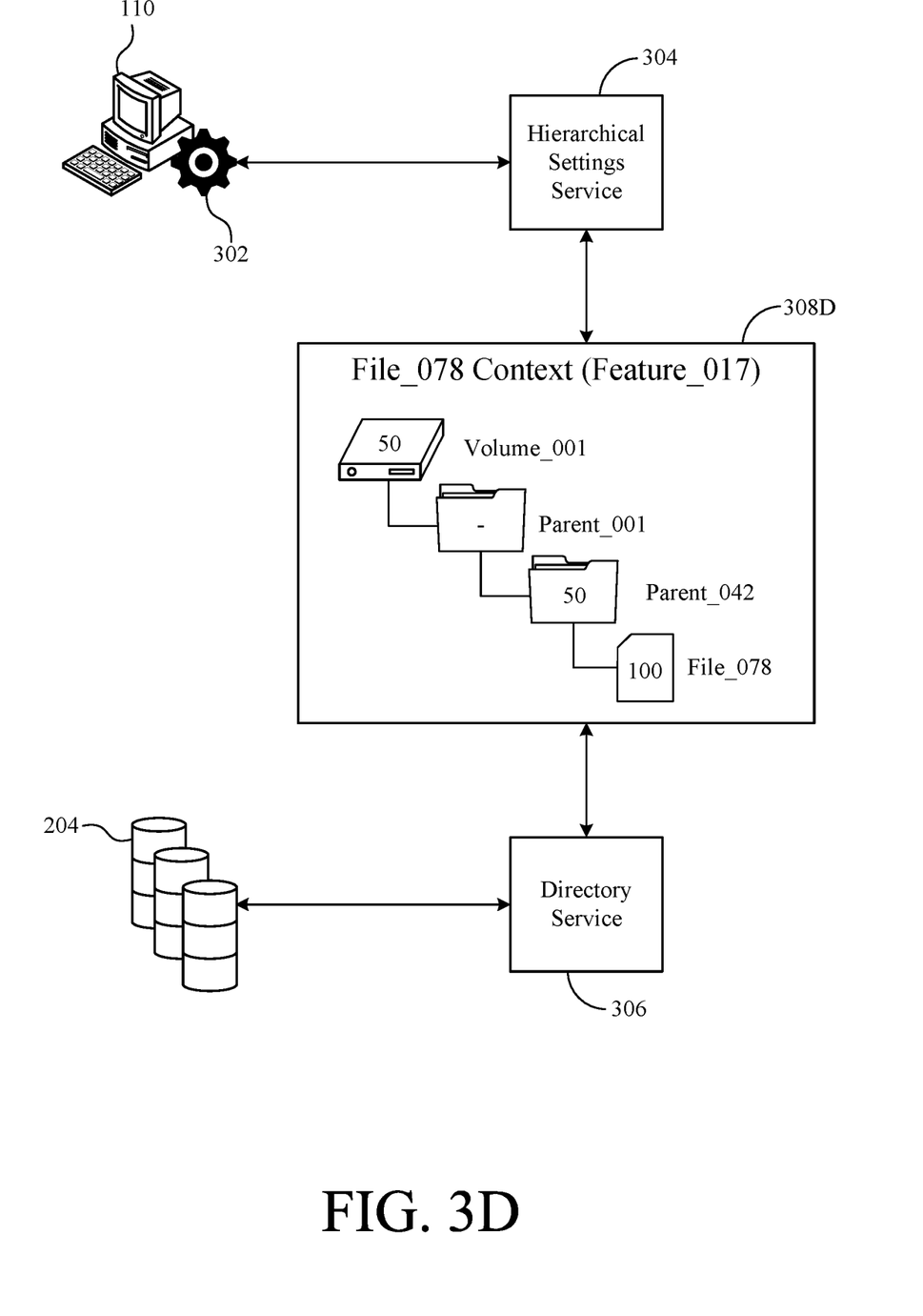
FIG. 3D is a block diagram showing an example of hierarchical settings corresponding to a file system hierarchy.

FIG. 3D shows yet another block diagram similar to FIG. 3A, but showing a file context 308D rather than a user context. In this example, context 308D corresponds to a File_078, which is stored in a folder ("Parent_042"), which is stored in another folder ("Parent_001"), which is the root-level folder on a storage device ("Volume_001"). In the example, hierarchical settings service 304 utilizes file context 308D to resolve a feature flag corresponding to a feature that affects file handling. In this case, the feature applies to a particular subset of files, regardless of who accesses the file, and so the hierarchical settings apply to the file system hierarchy instead of the user state hierarchy. Hierarchical settings service 304 can utilize some combination of the aforementioned methods for resolving a feature flag corresponding to file context 308D. However, a file system hierarchy is potentially much more complex than the typical user state hierarchy. Therefore, it is expected that a feature flag calculation would, in most cases, specifically target a particular level of the file system hierarchy, such as the root-level folder, rather than ascending/descending the hierarchy.

FIGS. 3A-3D illustrate the flexibility offered by the example embodiment. Developers can provide any combination of access probabilities to any subset of users (or files, folders, and so on), from a single user all the way up to entire client organizations. Additionally, developers only need to provide as much detail as desired in order to roll out a new feature to a portion of a user space.

In an alternative example, hierarchical settings service 304 can utilize a top-down approach, in which access is first determined at the client-level prior to descending to the lower levels. For example, if the client is allowed access to a feature, but the site is not, then the query will end and the user will not be given access to the feature. Such a rollout would allow developers to create scenarios such that, for example, half of clients may access the feature, and of the clients that do have access, a quarter of the corresponding sites have access, and so on. Using FIG. 3A as an example, with this method all clients are provided access to the feature. For each client, half of the sites have access to the feature. Of the half of sites that have access to the feature, all workgroups have access to the feature. Of those workgroups, a quarter of the users have access to the feature. This and other alternatives will be apparent to those of ordinary skill in the art, particularly in view of the present disclosure.

Figure 4:
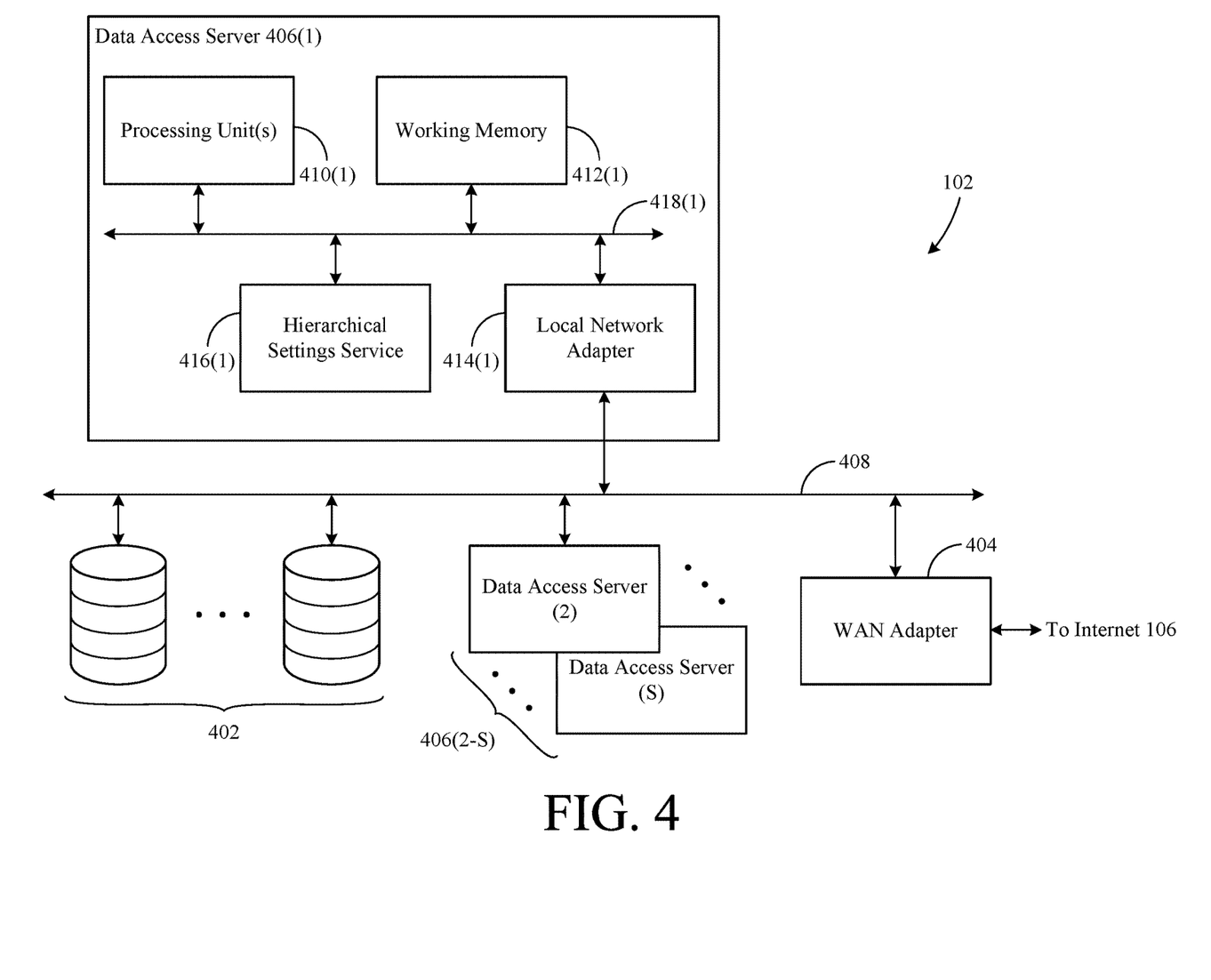
FIG. 4 is a block diagram showing the cloud service provider of FIG. 1 in greater detail.

FIG. 4 is a block diagram showing at least a portion of an example architecture of cloud service provider 102. Cloud service provider 102 is a cloud-based computer system including multi-tenant data storage devices 402, a WAN adapter 404, and data access servers 406(1-S), all interconnected via a local network 408. Storage devices 402 are network attached storage devices for storing data associated with multiple different cloud clients. Storage devices 402 can provide non-volatile data storage for use by the other components of remote cloud 102, as well. WAN adapter 404 is a network adapter for establishing a connection to internetwork 110. Elements of cloud service provider 102 utilize WAN adapter 404 to communicate with remote systems, such as local cloud 104.

Data access servers 406 provide data access for cloud customers associated with cloud service provider 102. In the example embodiment, server 406(1) also provides hierarchical settings services for client sites 104(1), as well as remote clients 114. Data access server 406(1) includes one or more processing units 410(1), working memory 412(1), a local network adapter 414(1), and a hierarchical settings services module 416(1), all interconnected via an internal bus 418(1). Processing unit(s) 410(1) are, for example, one or more hardware processors, microprocessors, and/or microchips that execute code transferred into working memory 412(1) from, for example, storage devices 402 to impart functionality to various components of data access server 406(1). This code includes a set of predefined instructions that cause processing unit(s) 410(1) to perform a corresponding set of operations in response to executing the code. The various functions of data access server 406(1) (including hierarchical settings service module 416(1)) are achieved by executing various subsets of the predefined instructions, the subsets being configured to cause processing unit(s) 410(1) to carry out the intended functionality. Working memory 412(1) includes, for example, random access memory that can also cache frequently used code, such as network locations of storage devices 402, to be quickly accessed by the various components of data access server 406(1). Local network adapter 414(1) provides a network connection between data access server 406(1) and local network 408 and, therefore, WAN adapter 404, which provides a connection to Internet 106. Hierarchical settings services 416(1) include various hardware, software, and/or firmware services, operating within or in conjunction with working memory 412(1), for evaluating feature access requests responsive to, for example, data access/modification requests. Hierarchical settings services 416(1) provide the functionality required to resolve whether a particular user, workgroup, domain, etc. should have access to a particular data access feature, for example. Although only data access server 406(1) is shown in detail, it should be understood that data access server 406(1) is substantially similar to data access servers 406(2-S), except that any of data access servers 406 can correspond to different subsets of cloud clients and, therefore, can be configured differently to utilize different data, connectors, applications, network connections, etc. The functionality of hierarchical settings services module 416(1) is shown in greater detail below, with reference to FIG. 5.

Figure 5:
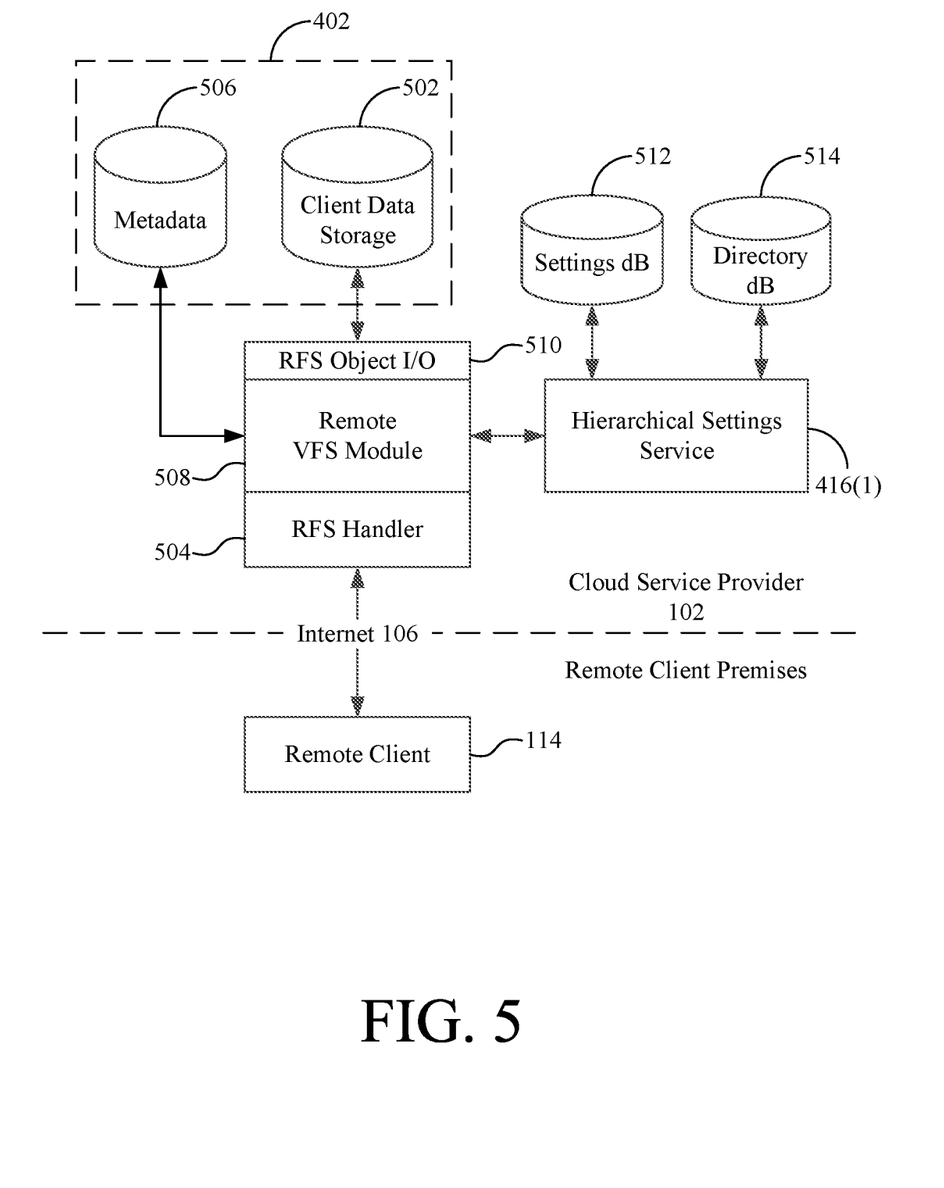
FIG. 5 is block diagram illustrating functional aspects of the hierarchical settings service of FIG. 4.

FIG. 5 is a block diagram showing functional aspects of data access server 406(1) in greater detail. Remote client 114 is a device and/or process used to access files in a client data store 502 via a remote file system (RFS) handler 504. Remote clients 114 can connect with RFS handler 504 via the Internet 106, for example. RFS handler 504 represents an interface/protocol by which remote clients 114 can access and modify client data store 502 and an associated metadata database 506, which together make up a remote file system (RFS) that is stored on storage devices 402. For example, RFS handler 504 can be an interface implementing HTTP, WebDAV, and/or FTP protocols, an interface compatible with a mobile application (e.g., an application running on a smart telephone, tablet, etc.), or some other interface with which an application on the remote client 114 can interact. Responsive to a remote client 114 requesting access, file access interface 504 calls remote virtual file system (VFS) module 508.

Remote VFS module 508 is a software plugin that provides remote client 114 with file and folder access to client data store 502. Initially, it should be noted that client data store 502 and metadata database 506 are stored on data storage devices 402. Metadata database 506 stores metadata (e.g., virtual files, virtual folders, permissions, etc.) that describes a hierarchical, virtual file system via which remote client 114 can access file system objects and make changes to client data store 502. Data storage devices 402 store data files that are associated with the virtual file system objects defined by the metadata. The metadata in database 506 stores paths to the associated data files on data storage devices 402, so that file system objects can be accessed, updated, and created on devices 402 in accordance with changes made by the remote client 114 to the virtual file system.

Remote VFS module 508 intercepts the file system calls coming from remote client 114 and enforces cloud permissions on file system access. If access is permitted, remote VFS module 508 utilizes metadata stored in metadata database 506 to provide remote client 114 with a hierarchical virtual file system (e.g., a directory tree view of folders and files) via which the remote client 114 can access and make changes to the file system objects. When a data file needs to be uploaded to, downloaded from, or deleted from client data storage devices 402, remote VFS module 508 utilizes RFS object I/O module 510 to retrieve or store the data file.

RFS object I/O module 510 manages the I/O subsystem for organized data file storage and access on data storage devices 402. Responsive to VFS module 508 and corresponding metadata, RFS object I/O module 510 downloads associated data files from, uploads associated data files to, and deletes associated data files from data storage devices 402. VFS module 508 provides data files to, and retrieves data files from, remote client 114 as needed via RFS handler 504.

Certain features utilized by RFS handler 504, remote VFS module 508, and RFS object I/O 510 may be hidden behind feature flags, as described above. According to some novel aspects of the example embodiment, hierarchical settings service 416(1) resolves the feature flag to determine whether the corresponding feature should be accessible by a particular remote client accessing the remote file system. Feature flag calculations have been discussed in detail above with reference to FIGS. 3A-3D. Here, the feature flag calculations will be discussed in the context of RFS handler 504, remote VFS module 508, and RFS object I/O 510, but more generally than done so above.

In an example embodiment, an updated process for encrypting newly uploaded files is hidden behind a feature flag. Remote client 114 provides a request to RFS handler 504 including a new file to be uploaded and authentication information. Remote VFS module 508 identifies that the new file is to be encrypted, and that the updated process is Hierarchical settings service 416 receives a request for a feature flag calculation corresponding to the updated encryption process from remote VFS module 508. The request includes authentication information corresponding to remote client 114 and information corresponding to the uploaded file, such as a corresponding file system pathway. Hierarchical settings service 416 retrieves associated information from a settings database 512 and a directory database 514. Settings database 512 includes the hierarchical settings corresponding to the particular feature (e.g. the updated encryption process), while directory database 514 includes information indicative of the user and file system hierarchies. This information is utilized by hierarchical settings service 416 to resolve the feature flag according to the description provided above.

Upon resolution of the feature flag, hierarchical settings service 416 provides a response to remote VFS module 508, which indicates whether or not to utilize the flagged feature. In the example embodiment, if the feature flag grants access to the feature, remote VFS module 508 encrypts the new file according to the updated process, updates metadata database 506, and provides the encrypted file to RFS object I/O 510 for storage in client data storage 502. If, instead, the feature flag does not grant access, the new file is encrypted according to the prior encryption process.

The following is additional pseudocode that illustrates several example embodiments of the present invention:

```
public boolean isFeatureAEnabled (SettingsContext settingsContext) {
    return settingsClient.get (featureAName, settingsContext) ;
}
ExperimentMembershipDecider featureBDecider = new
ExperimentMembershipDecider (featureBName) ;
public boolean isFeatureBEnabled (String username, SettingsContext settingsContext)
{
    Integer probability = get (featureAName, settingsContext) ;
    returnfeatureBDecider.includedInExperiment (probability, username) ;
}
public final class ExperimentMembershipDecider {
    private RepeatableHashGenerator hashGenerator ;
    public static final int MAX_PROBABILITY = 100 ;
    public ExperimentMembershipdecider String seed) {
        this.hashGenerator = new repeatableHashGenerator (seed) ;
    }
    public boolean includedInExperiment (int probability, String ...
partitionParameters) {
        if (probability <= 0 | probability > MAX_PROBABILITY |
ArrayUtils.isEmpty (partitionParameters)) {
            return false ;
        }
        int seededHash = hashGenerator.getSeededHash (partitionParameters) ;
        int seededHashInRange = abs (seededHash) % MAX_PROBABILITY;
        return seededHashInRange < probability ;
    }
}
ExperimentMembershipDecider featureCDecider = new
ExperimentMembershipDecider (featureCName) ;
public boolean isFeatureCEnabled (String filename, SettingsContext settingsContext)
{
    Integer probability = get(featureCName, settingsContext) ;
    return featureCDecider.includedInExperiment(probability, filename) ;
}
``` hidden behind a feature flag. Therefore, remote VFS module 508 must determine whether the current upload should utilize the updated encryption process or the prior encryption process (which is available to all users/files). In the example embodiment, the feature flag calculation is offloaded to hierarchical settings service 416, but in other embodiments all or part of the feature flag calculation could be performed by remote VFS module 508.

It is important to note that, in the example pseudocode, "userName" utilized in the "featureBDecider" is treated as an arbitrary string that is passed into the "ExperimentMembershipDecider" portion of the code. It is not utilized to lookup the probability stored in the settings. Nothing about its meaning as a username or its position in the hierarchy is leveraged in this portion of the code. Any string that has meaning to the feature at hand can be utilized. Similarly, "featureCDecider" utilizes a "filename", which is also treated as an arbitrary string.

As a further example, consider a feature that encrypts files in a different way. A value of 20 may be set for a particular domain in the context of featureB and featureC (which both correspond to the new encryption process). Should a corresponding feature flag query "isFeatureBEnabled( )", the result will be that 20% of the users in domain will have access to the new encryption feature. Should the feature flag instead query "isFeatureCEnabled( )", the result instead will be that 20% of the files in the domain will be encrypted according to the new feature.

The description of particular embodiments of the present invention is now complete. Many of the described features may be substituted, altered or omitted without departing from the scope of the invention. For example, alternate algorithms could be used in place of the specific pseudocode algorithm provided. Specifically, alternative methods may be substituted for the feature flag calculation. As another example, any type of process that maps data to a particular output value could be substituted for the hash functions shown by way of example. As yet another example, a different hierarchy or method of traversing the hierarchy could be utilized. As yet another example, while the hierarchical settings service is shown local to the data, it may also be stored and managed remotely to be accessed over the Internet for feature flag calculations, etc.

Alternate infrastructures are also possible. As an example, the present invention can be utilized in a cloud-native service environment, in which the hash value is calculated from some personally identifiable information received from the customer (e.g., IP address, password, username, etc.). Options for hierarchical settings can include various settings based on region, subscriber/non-subscriber, subscriber-type, etc. Such embodiments can provide rollout options for providing cloud customers with new features without the potential for major service disruptions. These and other deviations from the particular embodiments shown will be apparent to those skilled in the art, particularly in view of the foregoing disclosure.

We claim:

1. A method for progressively releasing features used in conjunction with a service in a computing environment including a plurality of users and a plurality of resources, said method comprising:
providing access to said service to said plurality of users;
providing a particular feature to be used in conjunction with said service;
maintaining a directory of at least some entities of said computing environment, said entities including said users of said plurality of users and said resources of said plurality of resources, said directory of said entities organizing said entities into groups;
assigning an access value associated with said particular feature to a particular group of said groups, said access value indicative of an assigned probability that said feature will be enabled with respect to a particular entity included in said particular group, said assigned probability being greater than zero and less than one;
responsive to said particular entity interacting with said service, accessing said directory to determine said access value assigned to said particular group;
determining, based on said access value associated with said particular feature, whether said particular feature is to be enabled with respect to said particular entity; and
based on a result of said determining step, enabling said particular feature with respect to said particular entity.

2. The method of claim 1, wherein:
said access value is a number; and
said step of determining whether said particular feature is to be enabled with respect to said particular entity includes performing a calculation utilizing said number as an input, a result of said calculation being a Boolean value; and further comprising
enabling said particular feature with respect to said particular entity if said Boolean value is equal to a first predetermined value; and
disabling said particular feature with respect to said particular entity if said Boolean value is equal to a second predetermined value different from said first predetermined value.

3. The method of claim 2, wherein said step of performing said calculation utilizing said number as said input includes:
calculating a hash value utilizing information associated with said particular group and a hash function;
performing a modulo operation on said hash value using a predetermined maximum probability value as the modulus to produce a remainder value, said maximum probability value being a predetermined maximum possible value of said access value; and
determining whether said remainder value is greater than, less than, or equal to said access value.

4. The method of claim 3, wherein said step of performing said calculation utilizing said integer as said input further includes:
assigning said first predetermined value to said Boolean value if said remainder value is less than said access value; and
assigning said second predetermined value to said Boolean value if said remainder value is greater than or equal to said access value.

5. The method of claim 4, wherein said information associated with said particular group includes a string uniquely indicative of said particular group.

6. The method of claim 3, wherein said step of calculating said hash value includes calculating said hash value utilizing at least a first seed string in combination with said information associated with said particular group, said first seed string being associated with said particular feature and being independent of said particular group and said particular user.

7. The method of claim 6, wherein said step of performing said calculation utilizing said number as said input produces a different Boolean value when utilizing a second seed string different from said first seed string.

8. The method of claim 6, further comprising:
determining whether to enable said particular feature with respect to a second entity included in a second group using information associated with said second group;
enabling said particular feature with respect to said particular entity; and
disabling said particular feature with respect to said second entity; and wherein
said access value corresponding to said particular entity is the same as a second access value corresponding to said second entity; and
said information associated with said particular group is different than said information associated with said second group.

9. The method of claim 6, further comprising:
determining whether to enable said particular feature with respect to a second entity, said second entity included in said particular group;

assigning a second access value associated with said particular feature to said second entity, said second access value indicative of a second assigned probability that said particular feature will be enabled with respect to said second entity; and wherein said second access value is an entity-level access value assigned to said second entity in said directory of said entities, said entity-level access value being a second number;

said step of determining whether to enable said particular feature with respect to said second entity includes performing a second calculation utilizing said second number as an input, a result of said second calculation being a second Boolean value;

said step of determining whether to enable said particular feature with respect to said second entity includes enabling said particular feature with respect to said second entity if said second Boolean value is equal to a first predetermined value and disabling access to said particular feature with respect to said second entity if said second Boolean value is equal to a second predetermined value different from said first predetermined value; and said step of determining whether to enable said particular feature with respect to said second entity includes calculating a second hash value utilizing said hash function and information associated with said second entity, said information associated with said second entity being different from said information associated with said particular group.

10. The method of claim 1, wherein:
said particular entity is a particular user; and
said particular group is a group including said particular user and other users.

11. A system for progressively releasing features used in conjunction with a service in a computing environment including a plurality of users and a plurality of resources, said system comprising:
a hardware processor configured to execute code, said code including at least a set of native instructions for causing said hardware processor to perform a corresponding set of operations when executed by said hardware processor; and
memory for storing data and said code, said data and said code including
a particular feature of said software service,
a directory of at least some entities of said computing environment, said entities including said users of said plurality of users and said resources of said plurality of resources, said directory of said entities organizing said entities into groups,
a first subset of said set of native instructions configured to provide access to said service to said plurality of users,
a second subset of said set of native instructions configured to receive an access value associated with said particular feature and associate said access value with a particular group of said groups, said access value indicative of an assigned probability that said feature will be enabled with respect to a particular entity included in said particular group, said assigned probability being greater than zero and less than one;
a third subset of said set of native instructions configured to, responsive to said particular entity interacting with said service, access said directory to determine said access value assigned to said particular group, a fourth subset of said set of native instructions configured to determine, based on said access value associated with said particular feature, whether said particular feature is to be enabled with respect to said particular entity, and
a fifth subset of said set of native instructions configured to enable said particular feature with respect to said particular entity if it is determined that said particular feature should be enabled with respect to said particular entity.

12. The system of claim 11, wherein:
said access value is an number;
said fourth subset of said set of native instructions is configured to perform a calculation utilizing said number as an input, a result of said calculation being a Boolean value;
said fifth subset of said set of native instructions configured to enable said particular feature with respect to said particular entity if said Boolean value is equal to a first predetermined value; and
said data and said code include a sixth subset of said set of native instructions configured to disable said particular feature with respect to said particular entity if said Boolean value is equal to a second predetermined value different from said first predetermined value.

13. The system of claim 12, wherein said fourth subset of said set of native instructions is configured to:
calculate a hash value utilizing information associated with said particular group and a hash function;
perform a modulo operation on said hash value using a predetermined maximum probability value as the modulus to produce a remainder value, said maximum probability value being a predetermined maximum possible value of said access value; and
determine whether said remainder value is greater than, less than, or equal to said access value.

14. The system of claim 13, wherein said fourth subset of said set of native instructions is configured to:
assign said first predetermined value to said Boolean value if said remainder value is less than said access value; and
assign said second predetermined value to said Boolean value if said remainder value is greater than or equal to said access value.

15. The system of claim 14, wherein said information associated with said particular group includes a string uniquely indicative of said particular group.

16. The system of claim 13, wherein said fourth subset of said set of native instructions is configured to calculate said hash value utilizing at least a first seed string in combination with said information associated with said particular group, said first seed string being associated with said particular feature and being independent of said particular group and said particular user.

17. The system of claim 16, wherein said fourth subset of said set of native instructions is configured to produce a different Boolean value when utilizing a second seed string different from said first seed string.

18. The system of claim 16, wherein:
said fourth subset of said set of native instructions is configured to determine whether to enable said particular feature with respect to a second entity included in a second group using information associated with said second group;
said fifth subset of said set of native instructions is configured to enable said particular feature with respect to said particular entity;

said sixth subset of said set of native instructions is configured to disable said particular feature with respect to said second entity;
said access value corresponding to said particular entity is the same as a second access value corresponding to said second entity; and
said information associated with said particular group is different than said information associated with said second group.

19. The system of claim 16, wherein:
said fourth subset of said set of native instructions is configured to determine whether to enable said particular feature with respect to a second entity;
said second subset of said set of native instructions is configured to receive a second access value associated with said particular feature and to associate said second access value with said second entity, said second access value being indicative of a second assigned probability that said particular feature will be enabled with respect to said second entity;
said second access value is an entity-level access value assigned to said second entity in said directory of said entities, said entity-level access value being a second number;
said fourth subset of said set of native instructions is configured to perform a second calculation utilizing said second number as an input, a result of said second calculation being a second Boolean value;
said fifth subset of said set of native instructions is configured to enable said particular feature with respect to said second entity if said second Boolean value is equal to a first predetermined value;
said sixth subset of said set of native instructions is configured to disable access to said particular feature with respect to said second entity if said second Boolean value is equal to a second predetermined value different from said first predetermined value; and
said fourth subset of said set of native instructions is configured to calculate a second hash value utilizing said hash function and information associated with said second entity, said information associated with said second entity being different from said information associated with said particular group.

20. The system of claim 11, wherein:
said particular entity is a particular user; and
said particular group is a group including said particular user and other users.

* * * * *